C. A. PURDY.
AUTOMATIC DOUGHNUT MACHINE.
APPLICATION FILED JUNE 26, 1920.
1,369,266.
Patented Feb. 22, 1921.
2 SHEETS—SHEET 1.
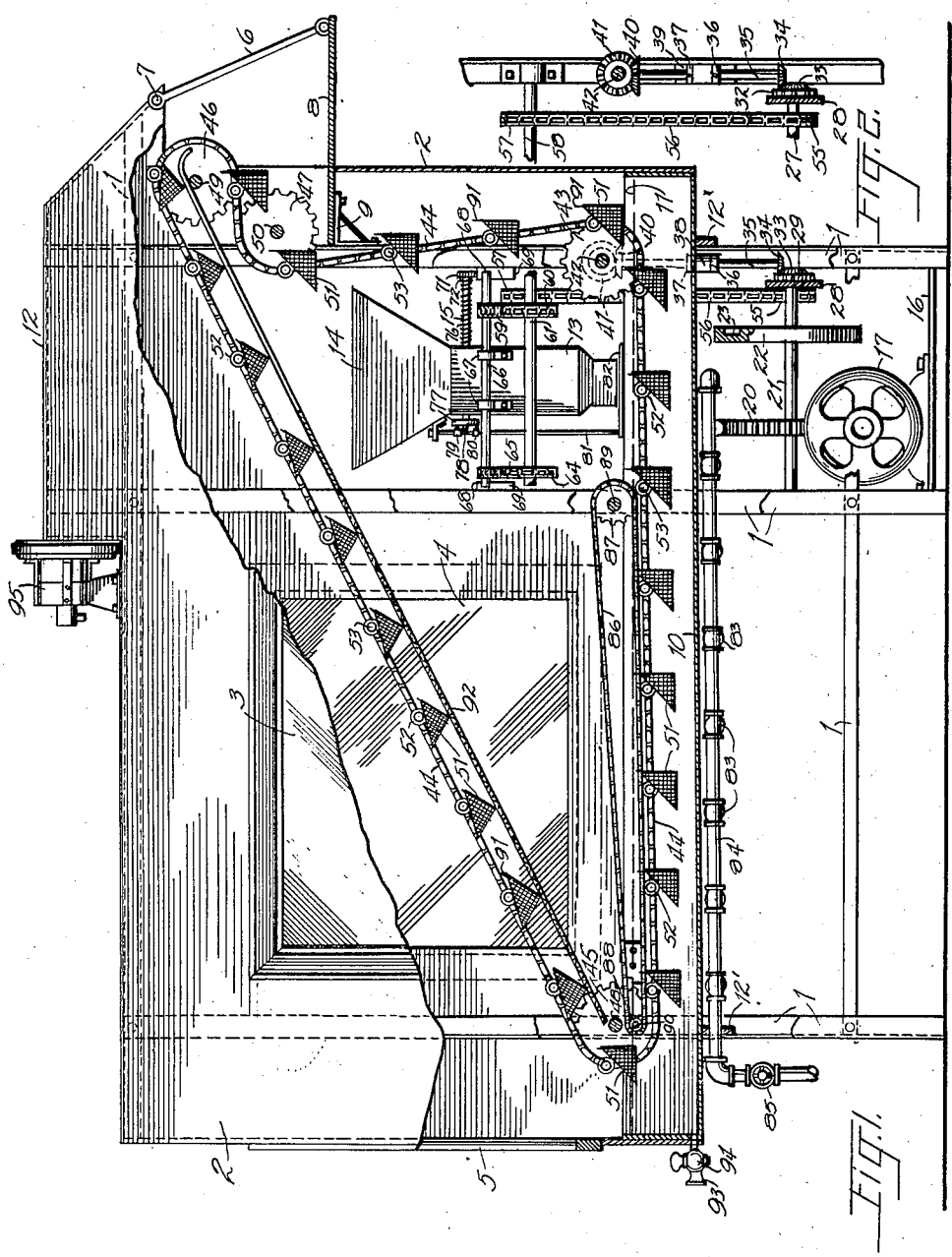
INVENTOR
C. A. Purdy
BY Munn & Co.
ATTORNEYS C. A. PURDY.
AUTOMATIC DOUGHNUT MACHINE.
APPLICATION FILED JUNE 26, 1920.
1,369,266.
Patented Feb. 22, 1921.
2 SHEETS—SHEET 2.
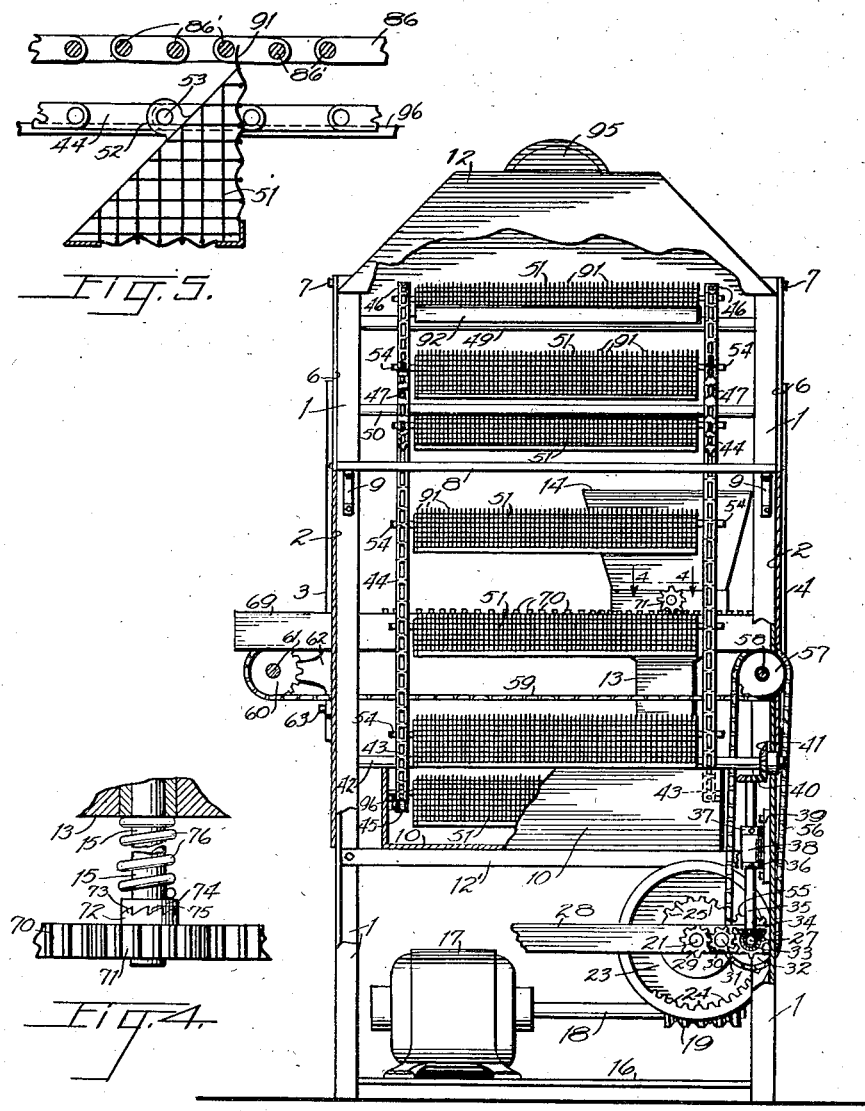
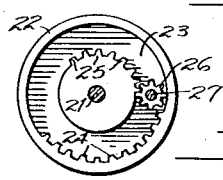
INVENTOR
C.A. Purdy
BY Munn & Co.
ATTORNEYS

UNITED STATES PATENT OFFICE.

CHESTER ARTHUR PURDY, OF CHICAGO, ILLINOIS.

AUTOMATIC DOUGHNUT-MACHINE.

1,369,266.   Specification of Letters Patent.   Patented Feb. 22, 1921.

Application filed June 26, 1920. Serial No. 391,994.

*To all whom it may concern:*

Be it known that I, CHESTER A. PURDY, a citizen of the United States, and a resident of Chicago, in the county of Cook and State of Illinois, have invented a new and useful Improvement in Automatic Doughnut-Machines, of which the following is a full, clear, and exact description.

My invention relates to improvements in doughnut machines, and it consists in the combinations, constructions, and arrangements herein described and claimed:

An object of my invention is to provide an automatic doughnut machine which is adapted to be operatively connected with a suitable prime mover, whereby the doughnuts are formed, dropped into a suitable container, immersed in a boiling oil or the like until done and then deposited in a receiving pan without any manual action being required beyond the placing of dough in the hopper of the machine.

A further object of my invention is to provide a device of the type described having means for keeping doughnuts submerged in the boiling oil until properly cooked.

A further object of my invention is to provide a device of the type described having means for draining the oil from the doughnuts when the same have been cooked.

A further object of my invention is to provide a device of the type described that is strong and durable in construction, relatively simple in operation, and not likely to get out of order easily.

A further object of my invention is to provide a device of the type described that is thoroughly practical commercially.

Other objects and advantages will appear in the following specification, and the novel features of the invention will be particularly pointed out in the appended claims.

My invention is illustrated in the accompanying drawings, forming part of this application, in which—

Figure 1 is a side view of the device, portions being broken away and other portions being shown in section, Fig. 2 is a detail of a fragmentary portion of the apparatus shown in Fig. 1, Fig. 3 is an end view of the device, portions being broken away and other portions being shown in section, Fig. 4 is an enlarged section along the line 4—4 of Fig. 3, Fig. 5 is an enlarged detail of a fragmentary portion of the device, Fig. 6 is a detail of a portion of the device.

In carrying out my invention, I provide a frame 1 formed of suitably disposed upright and horizontal members as shown. Secured to the supporting frame 1 and partly enveloping the same is a casing 2 provided with side windows 3 and 4 and an end window 5. The casing 2 is fashioned with a canopy or hood 12, which extends beyond the end of the casing, as shown. A portion of the casing 2 immediately beneath the extending portion of the canopy 12 is cut away and a horizontally disposed plate 8 is secured to the frame 1 by a bracket 9 to extend parallel with the projecting portion of the canopy 12. A member 6, which is hinged at 7 to the projecting portion of the canopy 12 normally swings inwardly against the plate 8 but may be swung outwardly to permit the placing of a receiving basket (not shown) or the like upon the plate 8.

A pan 10, which is normally filled with oil to the level indicated at 11, is maintained in position by cross bars 12' of the frame 1. The pan 10 extends substantially the entire length and width of the casing 2. Mounted above the pan 10 adjacent one end thereof is a doughnut forming machine 13 having a hopper 14 at its upper end. The doughnut machine 13 is of an ordinary construction and is provided with an interior mechanism for forming doughnuts from dough which is fed into the machine through the hopper 14. The interior mechanism is operated by the rotation of a shaft 15 which rotation is accomplished in a manner which will be hereinafter described. The doughnut forming machine forms no part of the invention, except in so far as it coöperates with the other parts of the device described in this specification.

Positioned beneath the doughnut forming machine upon a platform 16 is a motor 17. The drive shaft 18 of the motor 17 carries at its end a worm 19 which drives a worm wheel 20. The latter is rigidly mounted upon a shaft 21 which has its ends journaled in upright portions of the frame 1. A disk 22 is rigidly mounted upon the shaft 21 and is formed with an annular channel 23 in one face thereof. The annular channel 23, which is shallow but relatively wide, is provided with teeth 24 in its outer wall for a portion of the length thereof. Likewise, teeth 25 are provided in the inner wall of the channel 23. The arrangement of the teeth 24 and 25 with respect to each other is clearly shown in Figs. 3 and 6 of the drawings. A gear 26 keyed to the inner end of a stub shaft 27 is disposed in the annular channel 23 and engages successively the teeth 24 and 25 whereby the shaft 27 is alternately rotated in opposite directions. It will also be noted that the gear 26 is idle for a certain period of time during each complete revolution of the disk 22. The shaft 27 is journaled in a cross member 28 which is secured to uprights of the frame 1.

Rigidly mounted upon the outer end of the shaft 21 is a gear 29, which drives an intermediate gear 30. The gear 30 is mounted for rotation upon a stub shaft 31 that projects from the cross member 28. The gear 30 drives a gear 32 which is loosely mounted upon the outer end of the stub shaft 27. The gear 32 has a beveled portion 33 which has teeth in mesh with a bevel gear 34 that is rigidly mounted upon the lower end of a vertically extending shaft 35. The vertically extending shaft 35 has collars 36 and 37 which are secured thereto above and below a bearing 38, which is secured to the casing 2 in any suitable manner, as by means of bolts 39. A bevel gear 40, carried at the upper end of the shaft 35, drives a bevel gear 41 that is keyed to a shaft 42. The shaft 42 extends across the device and has its ends journaled in uprights of the frame 1. Sprockets 43 are rigidly mounted upon the shaft 42 and positioned at spaced distances from each inner side wall of the pan 10, the lower portion of the sprockets 43 depending within the latter as best seen in Fig. 3. The sprockets 43 drive endless chains 44 which are guided by sprockets 45, 46, and 47. The sprockets 45 are loosely mounted upon a shaft 48 which has its ends secured in uprights of the frame 1 and are positioned near the end of the pan 10 opposite from that at which the sprockets 43 are located. The sprockets 46 are positioned at the upper end of the device directly above the plate 8 and are loosely mounted upon a shaft 49, which has its ends secured to the frame 1. The sprockets 47 are carried at opposite ends of a shaft 50 which has its ends secured in the frame 1 and is positioned as shown in Fig. 1. It is to be understood that the sprockets 43, 45, 46, and 47 are arranged in pairs and that one of the endless chains 44 is engaged successively by one of each of the pairs while the other of the endless chains 44 is engaged by the other one of each of the pairs of sprockets.

A plurality of parallel spaced apart doughnut carriers 51 are disposed between the chains 44. The carriers 51 are each formed with a tubular portion 52 at each end adapted to loosely receive a rod 53. Horizontally alined pairs of rods 53, which are parallel with other pairs of the same rods are secured to chains 44 and have their ends 54 projecting therebeyond.

Referring now to Fig. 3, it is to be noted that I provide a sprocket 55 which is keyed to the stub shaft 27 between the cross member 28 and the gear 26. The sprocket 55 drives a chain 56, thereby driving a sprocket 57 that is rigidly mounted upon a shaft 58. The latter extends parallel with a side wall of the casing 2, being journaled in the frame 1. A second sprocket, which is positioned directly behind the sprocket 57 and is consequently not seen in Fig. 3 of the drawings, is also keyed to the shaft 58 and drives a chain 59, which in turn engages with a sprocket 60 that is mounted upon the outer end of a shaft 61. The shaft 61 has its ends secured in brackets 62. The latter are secured to upright portions of the frame 1 at each side of the doughnut forming machine 13 in any suitable manner as by means of bolts or screws 63. The shafts 58 and 61 are also provided with horizontally alined sprockets at their inner ends. The sprocket carried at the inner end of the shaft 58 is not shown in the drawings but engages a chain 65 which drives the sprocket 64. The latter is loosely mounted upon the inner end of the shaft 61. The chains 59 and 65 are secured to a guide 66 which is fastened to the doughnut forming machine 13 by means of brackets 67 and has its ends slidably disposed in slots 68 provided in cross members 69. The latter are fastened to uprights of the frame 1, being parallel with each other and extend entirely across the device.

The guide 66 is parallel with the shafts 58 and 61. It is obvious that the doughnut forming machine will be moved back and forth across the pan when the shaft 27 is alternately rotated in opposite directions. The upper side of one of the cross members 69 is formed with teeth 70 and is in effect a rack. A pinion 71 which is carried at the end of the shaft 15, engages with the teeth 70 of the cross member 69 and rotates the shaft 15 when the doughnut forming machine is being moved in one direction. Referring particularly to Fig. 4, it will be noted that the pinion 71 is formed with a hub 72 having its edge serrated at 73. A clutch member 74 which is feathered to the shaft 15 has its outer edge serrated at 75. A spring 76 mounted on the shaft 15 between the side of the doughnut forming machine 13 and the clutch 74 tends to move the latter into operative engagement with the serrated hub of the pinion 73, whereby the operation of the latter occasions the operation of the shaft 15.

A disk 77 is carried at the inner end of the shaft 15 and has an integral portion 78 projecting from its face adapted to engage successively with lugs 79 and 80, which are secured to a vertically extending shaft 81. The shaft 81 is provided at its lower end with a cutting wire or blade 82 which engages with the outlet chute of the doughnut forming machine 13 and when moved back and forth by the action of the shaft 81 shears at each operation a doughnut from the dough being forced through the machine.

From the foregoing description of the various parts of the device, the operation thereof may be readily understood. The containers 51 are moved in turn beneath the doughnut forming machine 13. As the doughnut forming machine 13 is moved across the pan 10, doughnuts are dropped into the container 51 that is directly beneath the doughnut forming machine at that time. The doughnut forming machine will then be returned to its position while the next container is moved forward into position beneath the machine. When the doughnut forming machine 13 is being returned, the shaft 15 will not be operated, since the serrations on the hub 72 will escape the serrations on the clutch member 74.

As each of the containers 51 is filled with doughnuts, it is moved forwardly through the boiling oil in the pan 10, which is heated by burners 83. The latter are positioned directly beneath the pan and supplied with fuel by a pipe 84. A valve 85 is positioned in the pipe 84 to control the flow of fuel therethrough.

A submerging device consisting of endless chains 86 positioned along opposite sides of the pan are connected by rods 86'. Pairs of sprockets 87 and 88 are positioned as shown and engage with the chains 86. The sprockets 87 are loosely mounted upon a shaft 89 that has its ends secured in the uprights of the frame 1. The sprockets 88 are loosely mounted upon a shaft 90, which is likewise secured to uprights of the frame 1 adjacent the outer end of the pan. The shafts 89 and 90, which are parallel, are disposed transversely across the pan 10.

Projecting wires 91 of the containers 51 engage the chains 86 and move the same along.

As the containers 51 are moved upwardly, they are tilted by contact with a drain board 92, which is positioned as shown. When each container passes between the sprockets 46, it is overturned and the doughnuts therein are deposited in a receiving basket (not shown) that may be placed upon the plate 8. The pan 10 is provided with a drain pipe 93 which has a cock 94 therein.

The device provides a means for effectively performing the function for which intended and since no manual action is required beyond the placing of dough in the hopper 14, a great saving in time and labor results in producing a given quantity of doughnuts.

When the teeth 25 of the disk 22 are in engagement with the gear 26, the doughnut forming mechanism is slowly moved across the pan 10 and during this movement several deposits of doughnuts are made in the carrier 51 that is positioned beneath the doughnut forming mechanism. Immediately upon the teeth 25 disengaging the gear 26, the latter is engaged by the teeth 24 to rapidly return the doughnut forming mechanism to its initial position, no doughnuts being deposited during this return movement as hereinbefore explained. The gear 26 is idle for a period after disengaging the teeth 24 on account of the gap between that end of the teeth 24 and the adjacent end of the teeth 25. Consequently, the doughnut forming mechanism remains in its initial position until the gear 26 is again engaged by the teeth 25, at which time the next successive carrier 51 will occupy the position directly beneath the doughnut forming mechanism.

A fan 95 is mounted upon the casing 2 and may be operated in an ordinary manner to draw the heated air from the device.

The projecting ends 54 of the rods 53 enter guideways 96 along the inner side walls of the pan 10, thereby maintaining the containers 51 partly submerged during their passage the length of the pan 10.

I claim:

1. An automatic doughnut machine comprising a doughnut forming mechanism, a container for boiling oil or the like, means for operating said doughnut forming mechanism, means for conveying the doughnuts formed thereby through the boiling oil until cooked, mechanical means for operating said last named means and said next to the last named means simultaneously, and auxiliary means for maintaining the doughnuts submerged in the boiling oil while being conveyed therethrough.

2. An automatic doughnut machine comprising a supporting frame, a casing therefor, a horizontally disposed pan extending substantially the length and width of the frame and secured thereto, a doughnut forming mechanism positioned above one end of said pan and mounted in the frame for slidable movement, mechanical means for moving said doughnut mechanism back and forth across said pan and for operating the doughnut forming mechanism to occasion the dropping of the doughnuts therefrom when the doughnut forming mechanism is being moved in one direction, a plurality of spaced apart carriers secured to an endless chain arranged to have a portion of its length submerged in the oil in the pan, means for conducting said carriers successively beneath said doughnut forming mechanism to receive the doughnuts dropped therefrom, and mechanical means for operating said first named means and said last named means simultaneously.

3. An automatic doughnut machine comprising a partly incased supporting frame, a horizontally disposed oil containing pan extending the length and width of the frame, means for heating the oil in said pan, a doughnut forming mechanism positioned above one end of said pan and arranged for slidable movement thereacross, mechanical means for moving said doughnut forming mechanism back and forth across said pan and for operating said doughnut forming mechanism to cause the doughnuts to be dropped therefrom when the doughnut forming mechanism is being moved in one direction, an inclined drain board mounted above said pan, a plurality of doughnut carriers positioned at spaced distances along an endless chain arranged to be conveyed through the boiling oil in said pan, guide sprockets arranged to engage said chain, means for operating certain of said guide sprockets to cause each doughnut carrier to be moved beneath said doughnut forming mechanism to receive the doughnuts dropped therefrom, then the length of the pan through the boiling oil contained therein, and finally to ascend the inclined drain board, said carriers being then arranged to deposit the doughnuts carried therein.

4. In an automatic doughnut machine, a pan for boiling oil and the like, a doughnut forming mechanism mounted for slidable movement across said pan, mechanical means for moving said doughnut forming mechanism slowly across the pan, for returning said doughnut forming mechanism rapidly to its original position, and for maintaining said doughnut forming mechanism in its original position for a predetermined period of time, and means operated by said last named means for operating the doughnut forming mechanism to occasion several deposits of doughnuts during the first named movement of the doughnut forming mechanism across the pan.

CHESTER ARTHUR PURDY.